US012711851B2

(12) United States Patent
Hardy et al.

(10) Patent No.: US 12,711,851 B2
(45) Date of Patent: Aug. 18, 2026

(54) MONITORING SYSTEM FOR FACILITIES

(71) Applicant: LIFEGUARD DIGITAL HEALTH INC., Vancouver (CA)

(72) Inventors: Jeffery Hardy, Surrey (CA); Alexander McGovern, Coquitlam (CA)

(73) Assignee: LIFEGUARD DIGITAL HEALTH INC., Vancouver (CA)

( * ) Notice: Subject to any disclaimer, the term of this patent is extended or adjusted under 35 U.S.C. 154(b) by 0 days.

(21) Appl. No.: 18/765,299

(22) Filed: Jul. 7, 2024

(65) Prior Publication Data

US 2025/0118193 A1 Apr. 10, 2025

Related U.S. Application Data

(60) Provisional application No. 63/512,596, filed on Jul. 7, 2023.

(30) Foreign Application Priority Data

Jul. 14, 2023 (CA) ................................ CA 3206673

(51) Int. Cl.
*G08B 25/00* (2006.01)
*G08B 3/10* (2006.01)
*G08B 21/02* (2006.01)
*G08B 25/01* (2006.01)

(52) U.S. Cl.
CPC ............. *G08B 25/002* (2013.01); *G08B 3/10* (2013.01); *G08B 21/02* (2013.01); *G08B 25/001* (2013.01); *G08B 25/016* (2013.01)

(58) Field of Classification Search
CPC ........ G08B 25/002; G08B 3/10; G08B 21/02; G08B 25/001; G08B 25/016
See application file for complete search history.

(56) References Cited

U.S. PATENT DOCUMENTS

| | | | | |
|---|---|---|---|---|
| 8,902,311 | B2 * | 12/2014 | Poder | G08B 25/14<br>340/517 |
| 9,741,236 | B2 * | 8/2017 | Hess | G08B 25/14 |
| 10,157,536 | B2 * | 12/2018 | Zuckerman | A61B 5/747 |
| 10,460,590 | B2 * | 10/2019 | Strack | G08B 27/001 |
| 11,451,948 | B2 * | 9/2022 | Hardy | G10L 13/00 |
| 2006/0154642 | A1 * | 7/2006 | Scannell, Jr. | F21S 6/002<br>455/404.1 |
| 2019/0110761 | A1 * | 4/2019 | Brasch | A61B 5/002 |
| 2021/0192919 | A1 * | 6/2021 | Hookway | G08B 25/009 |

* cited by examiner

*Primary Examiner* — John A Tweel, Jr.
(74) *Attorney, Agent, or Firm* — Oyen Wiggs Green & Mutala LLP

(57) ABSTRACT

A system for monitoring residential facilities with rooms includes a server, room units, and central units. The room units are located in the rooms and include a transceiver, a display for displaying a timer, input devices, and speakers. Each of the room units is associated with the room in which the room unit is located and with the residential facility thereof. Upon activation of one of the input devices, the timer commences decrementing from a pre-set amount of time. The transceiver transmits an alert to the server upon the timer reaching at least an end of the pre-set amount of time without activation of one of the input devices. The server, upon receipt of the alert, determines the residential facility and the room therein from which the alert was sent and transmits a message to the central units associated with the residential facility.

12 Claims, 3 Drawing Sheets

MONITORING SYSTEM FOR FACILITIES

CROSS-REFERENCE TO RELATED APPLICATIONS

This application claims the benefit of U.S. Provisional Patent Application No. 63/512,596 filed Jul. 7, 2023, the contents of which are hereby incorporated by reference.

TECHNICAL FIELD

The present disclosure relates to monitoring systems, and in particular, the present disclosure relates to monitoring systems in a residential facility.

BACKGROUND

Social housing facilities are commonly used by residents that are facing a number of challenges, including drug dependency, mental health issues, and/or poverty. Those residents face an increased chance of falling victim to tragic events such as drug overdoses, other medical emergencies, fires, or the like.

There is therefore a need for an easier and more convenient way to monitor the units in such a residential facility to prevent or reduce the likelihood of these events from occurring.

SUMMARY

In one aspect, a system for monitoring rooms in a residential facility comprises a server, a plurality of room units, and one or more central units. The server is in data communications with the room units and the central units. Each of the room units is associated with one of the rooms in the residential facility, while the central units are located at administrative areas of the residential facility.

The room units comprise a display that is configured to display a timer. The room units further comprise one or more buttons. Before a resident takes a drug, the resident presses an appropriate one of the buttons on the room unit, which causes the timer to start counting down. If the resident does not press the appropriate one of the buttons before the timer expires, an alert is sent from the room unit to the server indicating a possible drug overdose. The server is able to determine the room in which the room unit is located, and an appropriate message is sent to the central unit for display to an attendant at the residential facility so that appropriate action may be taken.

In another aspect, a system is provided for monitoring one or more residential facilities. Each of the residential facilities comprises one or more rooms. The system comprises a server, one or more room units, and one or more central units. Each of the room units is located in one of the rooms and comprise a transceiver configured to communicate with the server, a display configured to display a timer, one or more input devices, and one or more speakers. Each of the room units is associated with the room in which the room unit is located and with the residential facility thereof. Upon activation of one of the one or more input devices, the timer is configured to commence decrementing from a first pre-set amount of time. The one or more speakers are configured to emit a noise and the transceiver is configured to transmit an alert to the server upon the timer reaching at least an end of the pre-set amount of time without activation of one of the one or more input devices. The central units are in communications with the server. Each of the central units comprises a central unit display. Each of the central units is configured to be associated with one of the residential facilities. The server, upon receipt of the alert, is configured to determine the residential facility and the room therein from which the alert was sent and is further configured to transmit a message to the central units associated with the residential facility. Upon the receipt of the message by the central units, the central unit displays of the central units are configured to display a prompt identifying the room from which the alert was sent.

In a still another aspect, the server, upon receipt of the alert, is further configured to contact an appropriate one of emergency services.

In still yet another aspect, the input devices comprise buttons, and activation of the input devices comprises depressing of the buttons.

In a further aspect, the one or more speakers are configured to emit the noise and the transceiver is configured to transmit the alert to the server upon the timer reaching a second pre-set amount of time past the end of the first pre-set amount of time without activation of one of the one or more input devices.

In still a further aspect, each of the room units comprise a room unit identifier.

In still yet a further aspect, the room unit is associated with the room in which the room unit is located and with the residential facility thereof by the server generating an association among the room unit identifier of the room unit, the room in which the room unit is located, and the residential facility thereof.

In another aspect, the server is configured to generate the association upon a request sent to the server.

In still another aspect, the request is sent by one of the central units.

In still yet another aspect, the timer is reset upon activation of one of the one or more input devices.

In another aspect, the room units further comprise a temperature sensor, and the transceiver is configured to transmit the alert to the server upon the temperature sensor detecting an ambient temperature above a pre-set maximum temperature.

In still another aspect, the room units further comprise one or more microphones, and the transceiver is configured to transmit the alert to the server upon the microphones detecting sounds corresponding to an activated alarm.

In a further aspect, the activated alarm comprises one or more of the following: smoke alarms, carbon monoxide monitors, water sensor alarms, and personal alarm.

The foregoing was intended as a summary only and of only some of the aspects of the present disclosure. It was not intended to define the limits or requirements of the present disclosure. Other aspects will be appreciated by reference to the detailed description of the embodiments.

BRIEF DESCRIPTION OF THE DRAWINGS

The invention will be described by reference to the drawings thereof, in which.

DETAILED DESCRIPTION

Figure 1:
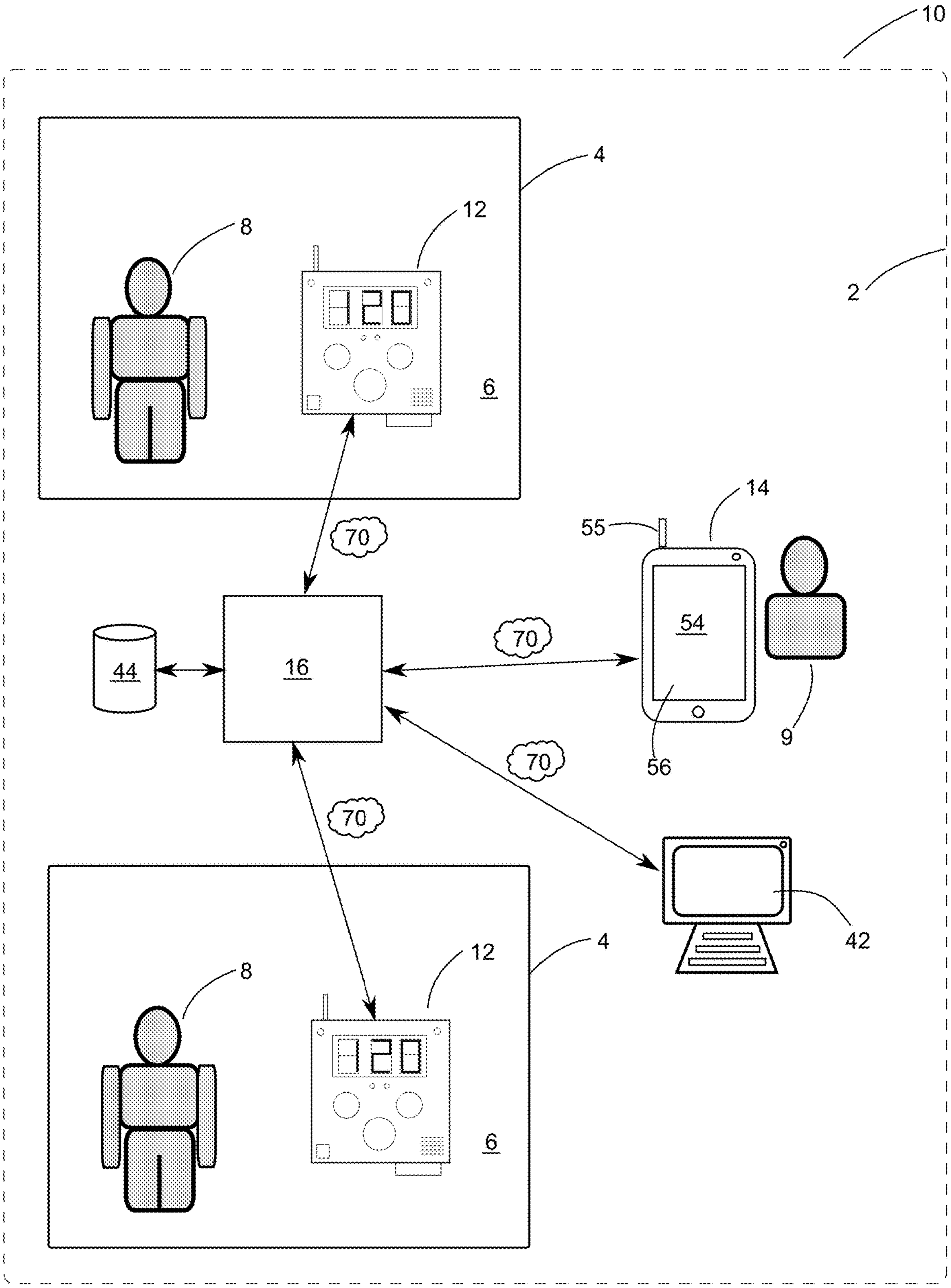
FIG. 1 depicts the system in accordance with one embodiment.

Referring to FIG. 1, according to one embodiment, the system 10 may be used in one or more residential facilities 2, with each of the residential facilities 2 comprising one or more rooms 4. In some embodiments, the residential facilities 2 may be organized into groups, with each of the groups comprising one or more residential facilities 2. The system 10 comprises one or more room units 12 and one or more central units 14. Each of the room units 12 may be associated with one of the rooms 4. The one or more central units 14 are located at administrative areas of the residential facilities 2, such as at a front desk or the like. The central units 14 may take the form of a personal computer, a laptop, a tablet, a smartphone, or the like.

The system 10 further comprises a server 16 that is in data communications with the room units 12 and the central units 14. The data communications among the server 16 and the room units 12 or the central units 14 may be wireless, although it is possible that the data communications are wired (or a combination of wireless and wired). The data communications may also be through a network 70, such as the Internet.

Figure 2:
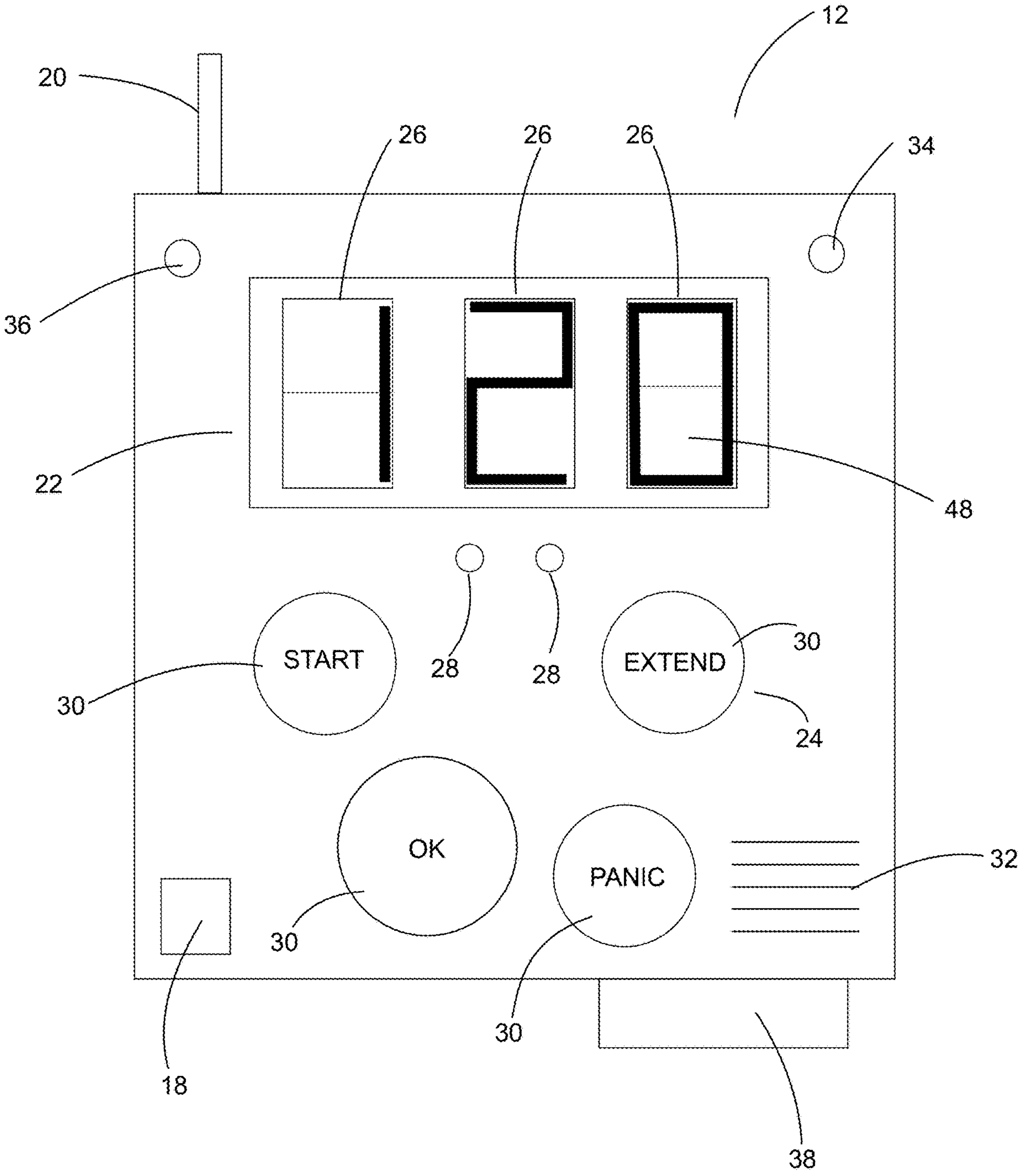
FIG. 2 depicts one embodiment of the room unit.

Referring to FIG. 2, the room units 12 comprise a room unit processor 18 and a room unit transceiver 20 configured to transmit and receive data from the server 16.

The room units 12 further comprise a display 22 and one or more input devices 24. In some embodiments, the display 22 may comprise a plurality of seven-segment displays 26 configured to display numerals. By way of example only, the display 22 may comprise three of the seven-segment displays 26 configured to display three numerals. In other embodiments, the display 22 may comprise a video screen. The display 22 may further comprise one or more status indicators 28. The status indicators 28 may comprise lights or the like and may be used to indicate error conditions or a current status of the room unit 12.

The input devices 24 may comprise buttons 30 (e.g. push buttons). By way of example only, the input devices 24 may comprise three of the buttons 30, with a first one of the buttons 30 for “Start”, a second one of the buttons 30 for “Extend”, and a third one of the buttons 30 for “OK”. In some embodiments, the display 22 and the input devices 24 may be combined together on the room unit 12, such as, for example, by providing a touchscreen display capable of both displaying information and accepting input (e.g. touch input).

The room units 12 may further comprise one or more speakers 32 configured to emit sounds or noise. The room units 12 may also comprise one or more microphones 34 and one or more temperature sensors 36. The room units 12 further comprise a power supply 38. In some embodiments, the power supply 38 may be a battery, whereas in other embodiments, the power supply 38 may from mains electricity.

One of the room units 12 may be located in each of the rooms 4 in the residential facilities 2. In some embodiments, the room unit 12 may be installed in one of the rooms 4 by fixedly attaching the room unit 12 to a surface, such as a wall 6 in the room 4. The room unit 12 should be installed on a location that is easily accessible to resident(s) 8 of the room 4. Each of the room units 12 is associated with a room unit identifier 40, which may be unique. The room unit identifier 40 may be alphanumeric or numeric. In some embodiments, the room unit identifier 40 may be displayed on the display 22.

When one of the room units 12 is first installed in one of the rooms 4, the room unit 12 is associated with the room 4 in which it is installed and the residential facility 2 in which the room 4 is located. This association may be carried out by the server 16 using one of the central units 14 or any other computers 42 capable of accessing the server 16 (such as over the network 70). For example, in some embodiments, the server 16 may be a web server configured to accept and handle requests over HTTP or the like. In other embodiments, the server 16 may communicate with the room units 12 and/or the central units 14 using the WebSocket communications protocol.

The central unit 14 or the computer 42 is capable of transmitting to the server 16 a request to associate the room unit identifier 40 of the room unit 12 with a particular one of the rooms 4 (e.g. using the room number or unit number for the room 4) and the residential facility 2 in which the room 4 is located (e.g. using the address for the residential facility 2 in which the room 4 is located). The server 16 is configured to generate an association among the room unit identifier 40, the room 4, and the residential facility 2. The association may be stored by the server 16 in a database 44 that is operably connected to the server 16.

Once the room unit 12 has been associated with a particular one of the rooms 4 of the residential facility 2, the room unit 12 is ready for operation.

In some embodiments, each of the central units 14 may also be associated with one or more rooms 4 of one of the residential facilities 2. Each of the central units 14 is associated with a central unit identifier 46, which may be unique. The association among the central unit 14 and the one or more rooms 4 of one of the residential facilities 2 may be carried out by the server 16 using one of the central units 14 or any other computers 42 capable of accessing the server 16. The central unit 14 or the computer 42 is capable of transmitting to the server 16 a request to associate the central unit identifier 46 of the central unit 14 with one or more rooms 4 (e.g. using the room numbers or unit numbers for the one or more rooms 4) and a particular one of the residential facilities 2 (e.g. using the address for the residential facility 2). The server 16 is configured to generate an association between the central unit identifier 46, the one or more rooms 4, and the residential facility 2. The association may be stored by the server 16 in the database 44.

In other embodiments, each of the central units 14 may be associated with a particular one of the residential facilities 2 (i.e. a “one-to-one” configuration). In such embodiments, the central units 14 could be considered to be associated with all of the rooms 4 in the particular one of the residential facilities 2. The association between the central unit 14 and the one of the residential facilities 2 may be carried out by the server 16 using one of the central units 14 or any of the other computers 42. The central unit 14 or the computer 42 is capable of transmitting to the server 16 a request to associate the central unit identifier 46 of the central unit 14 with the particular one of the residential facilities 2 (e.g. using the address for the residential facility 2). The server 16 is configured to generate an association between the central unit identifier 46 and the particular one of the residential facilities 2. The association may be stored by the server 16 in the database 44. Once the central unit 14 has been associated with a particular one of the residential facilities 2, the central unit is ready for operation.

In still other embodiments, each of the central units 14 may be associated with two or more of the residential facilities 2 (i.e. a “one-to-many” configuration). In such embodiments, the central units 14 may be considered to be associated with all of the rooms 4 in the two or more of the residential facilities 2. The association between the central unit 14 and the two or more of the residential facilities 2 may be carried out by the server 16 using one of the central units 14 or any of the other computers 42. The central unit 14 or the computer 42 is capable of transmitting to the server 16 a request to associate the central unit identifier 46 of the central unit 14 with the two or more of the residential facilities 2 (e.g. using the addresses for the residential facilities 2). The server 16 is configured to generate an association between the central unit identifier 46 and the two or more of the residential facilities 2. The association may be stored by the server 16 in the database 44. Once the central unit 14 has been associated with the two or more of the residential facilities 2, the central unit is ready for operation.

Figure 3:
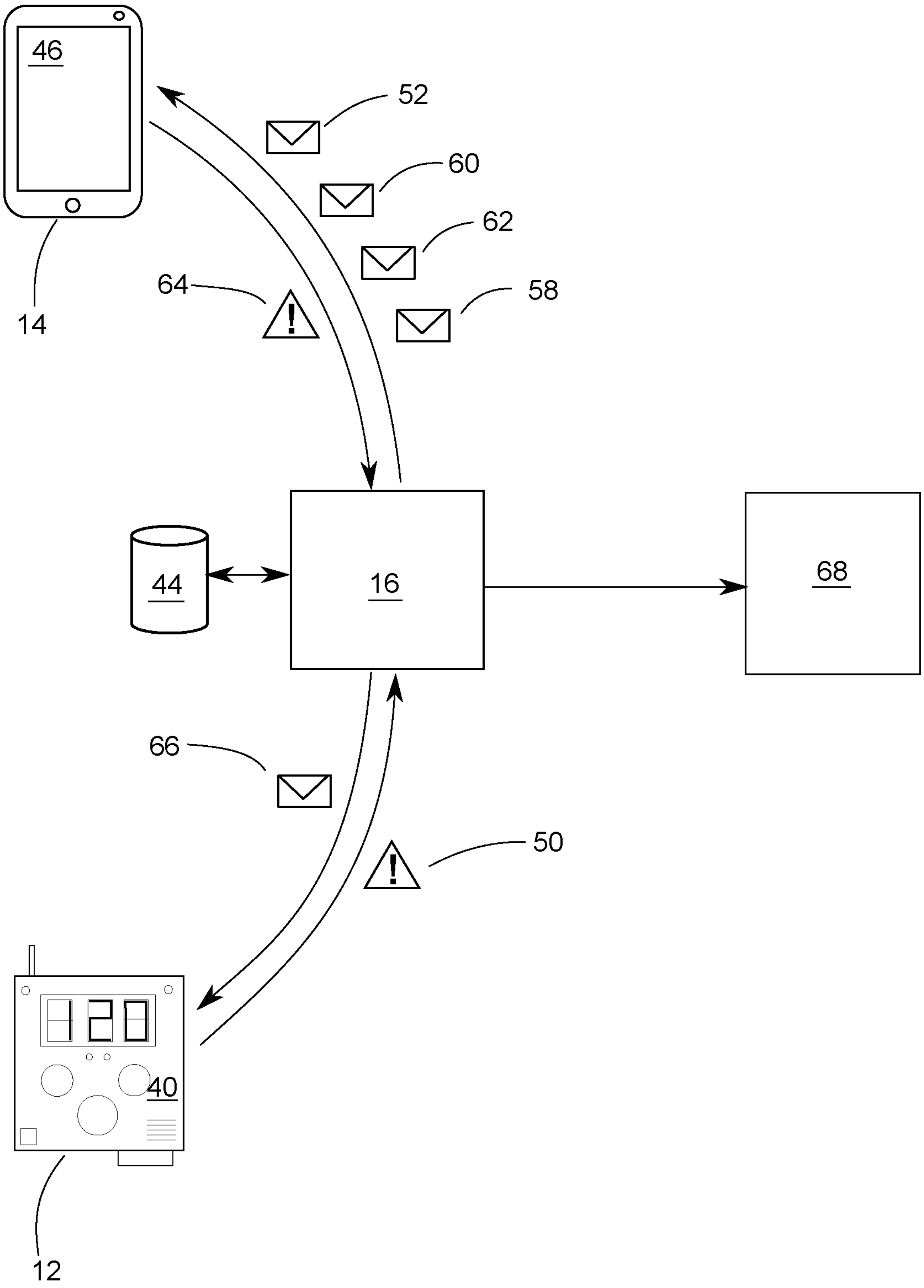
FIG. 3 depicts one embodiment of the flow of information for the system.

Referring to FIGS. 1 to 3, in operation, the resident 8 in the room 4 is able to interact with the room unit 12 through the display 22 and the input devices 24. In some embodiments, the display 22 is configured to display a timer 48 for helping in preventing fatalities from medical emergencies, including drug overdose fatalities. The timer 48 may be displayed using one or more of the seven-segment displays 26.

When the resident 8 is about to take a drug, the resident 8 first presses an appropriate one of the buttons 30 (e.g. the button 30 for "Start"). The room unit processor 18 will then cause the timer 48 to commence counting down from a pre-set starting amount of time (e.g. one minute). The pre-set starting amount of time may be changed as appropriate, such as through the central units 14 or the server 16. The room unit processor 18 will also cause the display 22 to be activated and to display the amount of time remaining on the timer 48 so that the resident 8 is able to see the amount of time remaining and to see the time counting down.

If one of the buttons 30 is pressed again by the resident 8, the room unit processor 18 is configured to carry out one or more actions, depending on which of the buttons 30 are pressed. For example, if the button 30 for "Start" is pressed again by the resident 8, the room unit processor 18 is configured to cause the timer 48 to pause. Accordingly, as the timer 48 has been paused, the display 22 will show the amount of time remaining in the timer 48 paused. If the button 30 for "Start" is pressed again by the resident 8, the room unit processor 18 is configured to cause the timer 48 to resume counting down and the display 22 to show the amount of time remaining in the timer 48 decrementing.

If the button 30 for "Extend" is pressed by the resident 8, the room unit processor 18 is configured to cause the timer 48 to be increased by a pre-set increment amount of time (e.g. an additional minute). The room unit processor 18 is also configured to cause the display 22 to display the updated amount of time remaining in the timer 48. In some embodiments, the room unit processor 18 is configured to only allow a maximum amount of time for the timer 48, regardless of how many times the button 30 for "Extend" is pressed.

If the button 30 for "OK" is pressed by the resident 8, the room unit processor 18 is configured to interpret this as meaning that the resident 8 has finished taking the drug and is conscious. The room unit processor 18 is configured to cause the timer 48 to be reset to the pre-set starting amount of time. In some embodiments, the room unit processor 18 is also configured to cause the display 22 to display an appropriate message and/or to turn off.

If the timer 48 reaches a pre-set threshold amount of time (e.g. 10 seconds) without any of the buttons 30 being pressed, the room unit processor 18 is configured to cause the speaker 32 to emit a noise (e.g. an alarm) to prompt the resident 8 to press an appropriate one of the buttons 30 (e.g. the button 30 for "OK"). If the timer 48 reaches zero (i.e. expires) without the resident 8 pressing an appropriate one of the buttons 30, the room unit processor 18 is configured to generate and transmit an alert 50 to the server 16 using the room unit transceiver 20. Alternatively, in order to reduce the likelihood of false alarms, the room unit processor 18 is configured to cause the speaker 32 to emit the noise and/or to generate and transmit the alert 50 to the server 16 using the room unit transceiver 20 only if a pre-set buffer amount of time has elapsed after the timer 48 expired without an appropriate one of the buttons 30 (e.g. the button 30 for "OK") being pressed. For example, the pre-set buffer amount of time may be 10 seconds. In some embodiments, the alert 50 may comprise information identifying the room unit identifier 40 of the room unit 12 that generated the alert 50. The alert 50 may also comprise information regarding the nature of the event causing the alert 50 (e.g. the timer 48 expiring, indicating a possible medical emergency, such as a drug overdose).

In some embodiments, the input devices 24 may comprise an additional one of the buttons 30 for "Panic". In these embodiments, if the resident 8 presses the button 30 for "Panic", the room unit processor 18 is configured to generate and transmit the alert 50 to the server 16 using the room unit transceiver 20 (i.e. without waiting for the timer 48 to expire). The alert 50 may comprise information identifying the room unit identifier 40 of the room unit 12 that generated the alert 50. The alert 50 may also comprise information regarding the nature of the event causing the alert 50 (e.g. the button 30 for "Panic" being pressed).

The alert 50 is received by the server 16. The server 16 is configured to, using information in the database 44, identify the room 4 and the residential facility 2 associated with the room unit identifier 40 transmitted as part of the alert 50. Based on this information, the server 16 is configured to identify the one or more central unit identifiers 46 of the central units 14 associated with the room 4 and/or the residential facility 2 from which the alert 50 was generated. The server 16 is further configured to transmit an emergency message 52 to the one or more central units 14.

The central units 14 comprise a central unit display 54 and a central unit interface 56. The central units 14 may comprise a central unit transceiver 55 for communicating with the server 16. In some embodiments, the central unit display 54 and the central unit interface 56 may be combined (e.g. by providing a touchscreen, such as in a tablet or smartphone). When the one or more central units 14 receives the emergency message 52, the central unit 14 will cause an appropriate visual prompt to be displayed on the central unit display 54. An appropriate audio prompt may also be generated by the central unit 14. The visual prompt may include the room number or unit number in which the room unit 12 that generated the alert 50 is located. In some embodiments, the visual prompt may further include the amount of time since the emergency message 52 was received, with the amount of time displayed in the visual prompt incrementing as time elapses. The visual prompt may also request that an attendant 9 provide confirmation that the alert 50 is being responded to. In order to do so, the attendant 9 will respond to the visual prompt on the central unit 14 using the central unit interface 56.

In addition, in order to "clear" the alert 50 (e.g. to indicate that it was a false alarm, etc.), the attendant 9 will also need to press an appropriate one of the buttons 30 (e.g. the button 30 for "OK") on the room unit 12 from which the alert 50 was generated. The server 16 is configured to detect, through communications with the central unit 14 and the room unit 12, when both of the conditions (i.e. the response to the visual prompt on the central unit 14 and the pressing of the appropriate one of the buttons 30 on the room unit 12) have been fulfilled. When both of the conditions have been fulfilled, the server 16 is configured to transmit a cleared message 58 to the central unit 14. When the central unit 14 receives the cleared message 58, the central unit 14 is configured to cease displaying the visual prompt on the central unit display 54. When the appropriate one of the buttons 30 (e.g. the button 30 for "OK") is pressed, the room unit processor 18 is configured to cause the speaker 32 to cease emitting a noise. In addition, the room unit processor 18 is configured to cause the timer 48 to be reset to the pre-set starting amount of time and/or to cause the display 22 to display an appropriate message and/or to turn off.

The visual prompt displayed on the central unit display 54 may also indicate the status of the alert 50. For example, the visual prompt may indicate that the attendant 9 has already provided confirmation that the alert 50 is being responded to but that the alert 50 has not yet been "cleared". This indication may be shown in a number of ways, including using different colors for different statuses. This may be helpful in situations where the visual prompt is displayed on more than one of the central units 14 (e.g. when more than one of the central units 14 is associated with the room 4 from which the alert 50 is generated).

In another example, if after the emergency message 52 is received by the central unit 14 but before the attendant 9 provides confirmation that the alert 50 is being responded to, the appropriate one of the buttons 30 on the room unit 12 is pressed (e.g. by the resident 8), the room unit processor 18 is configured to cause the speaker 32 to cease emitting the noise. The visual prompt displayed on the central unit display 54 will indicate a change in status. The visual prompt will prompt the attendant 9 to "clear" the alert 50.

In addition to transmitting the emergency message 52 to the central unit 14, the server 16 may also be configured to contact an appropriate one of emergency services 68 (e.g. 911 service or the like). In some embodiments, the server 16 may utilize a text-to-voice converter in order to convert the information related to the alert 50 (e.g. the room 4 and the residential facility 2 associated with the room unit identifier 40) into an audio message that is suitable for transmission to the emergency services 68. The server 16 contacts the emergency services 68 (e.g. by telephone) and plays the audio message to the emergency services 68 for the appropriate emergency response. The server 16 may be configured to continually repeat the audio message to allow the information therein to be properly recorded or noted by the emergency services 68.

The use of the audio message may be necessary because the emergency services 68 may be unable to receive calls other than voice calls. However, if the emergency services 68 is equipped to handle other type of calls (e.g. text messages, data calls, etc.), then the step of generating the audio message may be unnecessary.

The server 16 may be configured to automatically contact the emergency services 68 whenever the alert 50 relating to a possible medical emergency or overdose is received by the server 16. Alternatively, the server 16 may be configured to contact the emergency services 68 only when the alert 50 relating to a possible medical emergency or overdose is not cleared within a pre-set amount of time.

In some embodiments, the server 16 may also be configured to transmit messages (e.g. a text message using Short Messaging Service, or SMS) to one or more of the computers 42 when the alert 50 is received by the server 16. The computers 42 may include cellular telephones or the like.

The system 10 may be used for other functionality besides assistance with possible medical emergencies. In some embodiments, the room unit processor 18 is configured to cause the temperature sensor 36 located on the room unit 12 to periodically measure an ambient temperature of the room 4. For example, the time interval between successive measurements of the ambient temperature may be 5 minutes, or some other pre-set amount of time. If the room unit processor 18 determines that the measured ambient temperature of the room 4 is above a certain pre-set maximum temperature for greater than a pre-set amount of time (e.g. such as during a heat wave), the room unit processor 18 is configured to generate and transmit the alert 50 to the server 16 using the room unit transceiver 20. The alert 50 comprises the room unit identifier 40 for the room unit 12 and may indicate that the nature of the event generating the alert 50 is due to extreme heat.

The alert 50 is received by the server 16. The server 16 is configured to, using information in the database 44, identify the room 4 and the residential facility 2 associated with the room unit identifier 40 transmitted as part of the alert 50. Based on this information, the server 16 is configured to identify the one or more central unit identifiers 46 of the central units 14 associated with the room 4 and the residential facility 2 from which the alert 50 was generated. The server 16 is further configured to transmit a heat message 60 to the one or more central units 14.

In other embodiments, the room unit processor 18 is configured to cause the temperature sensor 36 located on the room unit 12 to periodically measure an ambient temperature of the room 4, and, once measured, the room unit processor 18 is further configured to cause the measured ambient temperature to be transmitted to the server 16 using the room unit transceiver 20. In this manner, the room unit 12 may be periodically transmitting the measured ambient temperature (as measured by the temperature sensor 36) to the server 16. For example, the time interval between successive measurements of the ambient temperature may be 5 minutes, or some other pre-set amount of time.

The server 16 is configured to receive the measured ambient temperatures from multiple ones of the room units 12. The server 16 is further configured to determine if the measured ambient temperature for any of the room units 12 is above the certain pre-set maximum temperature for greater than the pre-set amount of time. If the server 16 determines that one or more of the room units 12 fit this criteria, the server 16 may be further configured to identify the one or more central unit identifiers 46 of the central units 14 associated with the room or rooms 4 and the residential facility or residential facilities 2 for which the criteria is met. The server 16 may be configured to transmit the heat message 60 to the one or more central units 14.

When the one or more central units 14 receives the heat message 60, the central unit 14 will cause an appropriate visual prompt to be displayed on the central unit display 54. An appropriate audio prompt may also be generated by the central unit 14. The visual prompt may include the room number or unit number in which the room unit 12 that generated the alert 50 is located. The visual prompt may also request that an attendant 9 provide confirmation that the alert 50 is being responded to. In order to do so, the attendant 9 will respond to the visual prompt on the central unit 14 using the central unit interface 56.

In some embodiments, the room unit processor 18 and the microphone 34 located on the room unit 12 may be configured to monitor for the sounds generated by various alarms when activated. These alarms include, but are not limited to, smoke alarms, carbon monoxide monitors, water sensor alarms, personal alarms, or the like. This may be done by causing the room unit processor 18 to monitor sounds detected by the microphone 34 and to identify when certain sound frequencies, sound patterns, and/or certain sound intensities that are characteristic of the sounds generated by activated alarms are picked up by the microphone 34. When such sound frequencies, sound patterns, and/or sound intensities are detected by the room unit processor 18, the room unit processor 18 may be configured to generate and transmit the alert 50 to the server 16 using the room unit transceiver 20. The alert 50 comprises the room unit identifier 40 for the room unit 12 and may indicate that the nature of the event generating the alert 50 is due to an activated alarm.

In other embodiments, the room unit processor 18 may also be configured to monitor sounds detected by the microphone 34 and to identify when particular words or phrases are said. For example, the room unit processor 18 may be configured to identify when the phrase "Send help" is said. When the particular words or phrases are detected by the room unit processor 18, the room unit processor 18 may be configured to generate and transmit the alert 50 to the server 16 using the room unit transceiver 20. The alert 50 comprises the room unit identifier 40 for the room unit 12 and may indicate the particular words or phrases generating the alert 50.

The alert 50 is received by the server 16. The server 16 is configured to, using information in the database 44, identify the room 4 and the residential facility 2 associated with the room unit identifier 40 transmitted as part of the alert 50. Based on this information, the server 16 is configured to identify the one or more central unit identifiers 46 of the central units 14 associated with the room 4 and the residential facility 2 from which the alert 50 was generated. The server 16 is further configured to transmit an alarm message 62 to the one or more central units 14. In some embodiments, the server 16 is further configured to contact the emergency services 68.

When the one or more central units 14 receives the alarm message 62, the central unit 14 will cause an appropriate visual prompt to be displayed on the central unit display 54. An appropriate audio prompt may also be generated by the central unit 14. The visual prompt may include the room number or unit number in which the room unit 12 that generated the alert 50 is located. The visual prompt may also request that an attendant 9 provide confirmation that the alert 50 is being responded to. In order to do so, the attendant 9 will respond to the visual prompt on the central unit 14 using the central unit interface 56.

In some embodiments, the attendant 9 is able to use the central unit 14 to alert residents 8 in one or more rooms 4 to evacuate. For example, the attendant 9 is able to use the central unit interface 56 to generate and transmit an evacuation alert 64 to the server 16. The evacuation alert 64 may comprise information on one or more of the rooms 4 to which the evacuation alert 64 is directed. For example, the attendant 9 is able to use the central unit interface 56 to select the one or more of the rooms 4 to which the evacuation alert 64 is directed. In other embodiments, the attendant 9 is able to use the central unit interface 56 to select that all of the rooms 4 in the residential facility 2 will be affected by the evacuation alert 64. The rooms 4 that will be affected by the evacuation alert 64 may not necessarily be the rooms 4 that are associated with the central unit identifier 46 of the central unit 14.

The evacuation alert 64 is received by the server 16. The server 16 is configured to identify the rooms 4 to which the evacuation alert 64 is directed. Based on information in the database 44, the server 16 is configured to identify the room unit identifiers 40 for the rooms 4 to which the evacuation alert 64 is directed. The server 16 is further configured to transmit an evacuation message 66 to the one or more room units 12.

When the evacuation message 66 is received by the room unit transceiver 20, the room unit processor 18 is configured to cause the speaker 32 to emit a noise (e.g. an alarm). The noise emitted by the speaker 32 may be different from that emitted by the speaker 32 when the timer 48 reaches the pre-set threshold amount of time.

In some embodiments, the server 16 is configured to generate reports listing a history of the alerts 50 received by the server 16, including information on the times/dates of the alerts 50 and the locations (i.e. rooms 4) from which the alerts 50 were generated. These reports may be viewed on the central units 14 on the central unit display 54.

It will be appreciated by those skilled in the art that the preferred embodiment has been described in some detail but that certain modifications may be practiced without departing from the principles of the invention.

The invention claimed is:

1. A system for monitoring one or more residential facilities, each of the residential facilities comprising one or more rooms, the system comprising:

a server;

one or more room units, each of the room units located in one of the rooms and comprising:

a transceiver configured to communicate with the server;

a display configured to display a timer;

one or more input devices; and one or more speakers;

wherein each of the room units is associated with the room in which the room unit is located and with the residential facility thereof;

wherein upon activation of one of the one or more input devices, the timer is configured to commence decrementing from a first pre-set amount of time;

wherein the one or more speakers are configured to emit a noise and the transceiver is configured to transmit an alert to the server upon the timer reaching at least an end of the pre-set amount of time without activation of one of the one or more input devices; and one or more central units in communications with the server, each of the central units comprising a central unit display, wherein each of the central units is configured to be associated with one of the residential facilities;

wherein the server, upon receipt of the alert, is configured to determine the residential facility and the room therein from which the alert was sent and is further configured to transmit a message to the central units associated with the residential facility; and wherein, upon the receipt of the message by the central units, the central unit displays of the central units is configured to display a prompt identifying the room from which the alert was sent.

2. The system of claim 1, wherein the server, upon receipt of the alert, is further configured to contact an appropriate one of emergency services.

3. The system of claim 1, wherein the input devices comprise buttons, and wherein activation of the input devices comprises depressing of the buttons.

4. The system of claim 1, wherein the one or more speakers are configured to emit the noise and the transceiver is configured to transmit the alert to the server upon the timer reaching a second pre-set amount of time past the end of the first pre-set amount of time without activation of one of the one or more input devices.

5. The system of claim 1, wherein each of the room units comprise a room unit identifier.

6. The system of claim 5, wherein the room unit is associated with the room in which the room unit is located and with the residential facility thereof by the server generating an association among the room unit identifier of the room unit, the room in which the room unit is located, and the residential facility thereof.

7. The system of claim 6, wherein the server is configured to generate the association upon a request sent to the server.

8. The system of claim 7, wherein the request is sent by one of the central units.

9. The system of claim 1, wherein the timer is reset upon activation of one of the one or more input devices.

10. The system of claim 1, wherein the room units further comprise a temperature sensor, and wherein the transceiver is configured to transmit the alert to the server upon the temperature sensor detecting an ambient temperature above a pre-set maximum temperature.

11. The system of claim 1, wherein the room units further comprise one or more microphones, and wherein the transceiver is configured to transmit the alert to the server upon the microphones detecting sounds corresponding to an activated alarm.

12. The system of claim 11, wherein the activated alarm comprises one or more of the following: smoke alarms, carbon monoxide monitors, water sensor alarms, and personal alarm.

* * * * *